US008200043B2

(12) United States Patent
Fan et al.

(10) Patent No.: US 8,200,043 B2
(45) Date of Patent: Jun. 12, 2012

(54) PAGE ORIENTATION DETECTION BASED ON SELECTIVE CHARACTER RECOGNITION

(75) Inventors: Zhigang Fan, Webster, NY (US); Michael R. Campanelli, Webster, NY (US); Dennis Venable, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 1047 days.

(21) Appl. No.: 12/113,264

(22) Filed: May 1, 2008

(65) Prior Publication Data

US 2009/0274392 A1 Nov. 5, 2009

(51) Int. Cl.
*G06K 9/20* (2006.01)
*G06K 9/32* (2006.01)
*G06K 9/36* (2006.01)
*G06K 15/00* (2006.01)
*H04N 1/40* (2006.01)
*G09G 5/00* (2006.01)

(52) U.S. Cl. ........ 382/290; 382/286; 382/289; 382/291; 382/292; 382/296; 382/297; 345/649; 345/658; 358/2.1

(58) Field of Classification Search .................. 382/286, 382/289–292, 296, 267; 358/448, 488, 2.1; 345/649, 658
See application file for complete search history.

(56) References Cited

U.S. PATENT DOCUMENTS 5,867,277 A * 2/1999 Melen et al. ................. 358/296
6,081,616 A * 6/2000 Vaezi et al. .................. 382/171
6,377,705 B1 * 4/2002 Sato et al. .................... 382/197
6,546,215 B2 * 4/2003 Machida ....................... 399/82
6,577,763 B2 * 6/2003 Fujimoto et al. ............. 382/199
7,151,860 B1 * 12/2006 Sakai et al. ................... 382/297
2004/0179733 A1 * 9/2004 Okubo ......................... 382/180

OTHER PUBLICATIONS

Ávila et al., "A Fast Orientation and Skew Detection Algorithm for Monochromatic Document Images", In DocEng '05, Proc. ACM symposium on Document engineering, pp. 118-126, 2005.*

* cited by examiner

*Primary Examiner* — Brian Q Le
*Assistant Examiner* — Jose M Torres
(74) *Attorney, Agent, or Firm* — Fay Sharpe LLP

(57) ABSTRACT

A system and method for character recognition with document orientation determination is shown. The method is a detection of simple page orientation based on a limited version of character recognition. The method includes binairizing an input image which has a plurality of alphanumeric characters with a first orientation. The method continues with extracting the connected components and determining a second orientation where the second orientation is based on a 90° turn clockwise or counterclockwise or, in the alternative, no turn from the first orientation. The second orientation will result in a 180° variance from the proper orientation or it will be the proper orientation. The method continues with implementing a limited version of optical character recognition for an analysis of a character and determining if that second orientation is upside down, based at least in part on the analysis. This method generally uses the character "i" for analysis. However, for documents that have a limited number of "i"s, e.g. such as Russian documents or documents with all capital letters, the "T" may also be used.

15 Claims, 4 Drawing Sheets

PAGE ORIENTATION DETECTION BASED ON SELECTIVE CHARACTER RECOGNITION

BACKGROUND

This disclosure relates to a method and system for detecting simple page orientation through digital image manipulation, including analyzing and changing the content and/or appearance of the digital images. More particularly, this disclosure is related to a system and method for simple page orientation detection based on a limited version of character recognition and thus will be described with particular reference thereto. However, it should be appreciated that some embodiments are amenable to other applications.

By way of background, the prime orientation (0°, 90°, 180°, 270°) of a scanned page is often required to be directed as a first step for further processing. This can generally range from simple operations, such as image displaying to operations that can be more complex, like document analysis procedures. Page orientation for text documents can be determined by Optical Character Recognition (OCR). When a machine that implements OCR is fed with a page having an incorrect orientation, the error rate for reading characters tends to be very high. In some cases, the OCR module will communicate this error rate and not be able to find a proper orientation. However, in most cases, the correct orientation can be found by running the OCR in four different orientations. The machine running the OCR will then select the one orientation associated with the OCR confidence level that is highest. This method, however, has two major disadvantages. The first disadvantage is that OCR procedures typically consume significant computer cycles. The second disadvantage is that OCR is a complex program that may not necessarily be available in smaller systems with limited resources.

In an effort to combat these problems, OCR may be run in a multiple step fashion. Specifically, the page is divided into a few smaller regions. OCR is then performed on these regions, one by one, in the four orientations. The procedure will then generally continue until enough evidence is gathered for finding the correct page orientation. This usually only requires using OCR through a portion of the page. Although this process sometimes helps in solving the first problem, the second problem still exists in that OCR may not be available in smaller systems.

There is a need in the art for a procedure which can find simple page orientation with the reliability of OCR but uses fewer computer cycles. There is also a need in the industry for a program that is not as complex as OCR and can be run and implemented through smaller systems with limited resources. There is a further need in the art for this system to be cost effective without implementing major changes in existing software. This disclosure solves the above-referenced difficulties as well as many others.

BRIEF DESCRIPTION

Aspects of the present disclosure and embodiments thereof include the following apparatus embodiments. A scanning device which is configured to determine the orientation of a scanned image having a plurality of characters includes a scanner configured to read an input image with a given orientation. The scanning device further includes a pre-processing module that is communication with the scanner and is adapted to binairize the input image to a black and white digital representation. The scanner further includes a component extractor configured to isolate characters for an orientation analysis and an orientation module which is configured to appraise the height and width ratios for a plurality of alpha numeric characters within the input image in order to find a second orientation by determining if the given orientation is 90° or 270° away from the proper orientation. The second orientation is either the proper orientation or 180° from the proper orientation. The orientation module is then configured to identify a sample character for a 180° orientation analysis based on selective optical character recognition which is used, at least in part, to determine if the second orientation is 180° from the proper orientation or at the proper orientation.

According to another aspect of the claimed disclosure, a method for detecting simple page orientation based on limited versions of character recognition comprises binairizing a page, including a plurality of alphanumeric characters having a first orientation, extracting the connected components, determining a second orientation where the second orientation is based on the 90° turn clockwise or counter-clockwise or no turn from the first orientation, where the second orientation results in a 180° variance from the proper orientation or is the proper orientation. The method continues with implementing a limited version of optical character recognition for analysis of a character and determining if the second orientation is upside down, based at least in part on this analysis.

According to another aspect of the present disclosure, a method for determining a proper orientation of a scanned image, having a plurality or alpha numeric characters comprises receiving a scanned image having a given orientation, binairizing the scanned image to black and white, determining height and width ratios for the plurality of alpha numeric characters and finding a second orientation by determining if the given orientation is 90° or 270° away from the proper orientation, based at least in part on the height to width radio. It should be noted that the second orientation is either the proper orientation or 180° from the proper orientation. The method continues with identifying a sample character for 180° orientation analysis based on selective optical character recognition and determining if the second orientation is 180° or 0° from the proper orientation through the analysis of the sample character.

According to another aspect of the present disclosure, the sample character is "i". According to another aspect of the present disclosure, the sample character is "T".

DETAILED DESCRIPTION

As described in further detail below, this disclosure relates to a system and method for detecting simple page orientation of a scanned input image having a plurality of alphanumeric characters. This disclosure describes a simple page orientation detection method which locates certain sample characters that are relatively simple to analyze orientation. An example letter is "i" in the lower case. Another sample character which may be used primarily for documents that do not contain the "i" is the "T" in the upper case. The sample characters include an orientation which is unambiguous (unlike the letter "o"). The procedure of the present described embodiment contains three general steps; 1) preparation; 2) portrait/landscape detection; 3) upside down detection.

Figure 1:
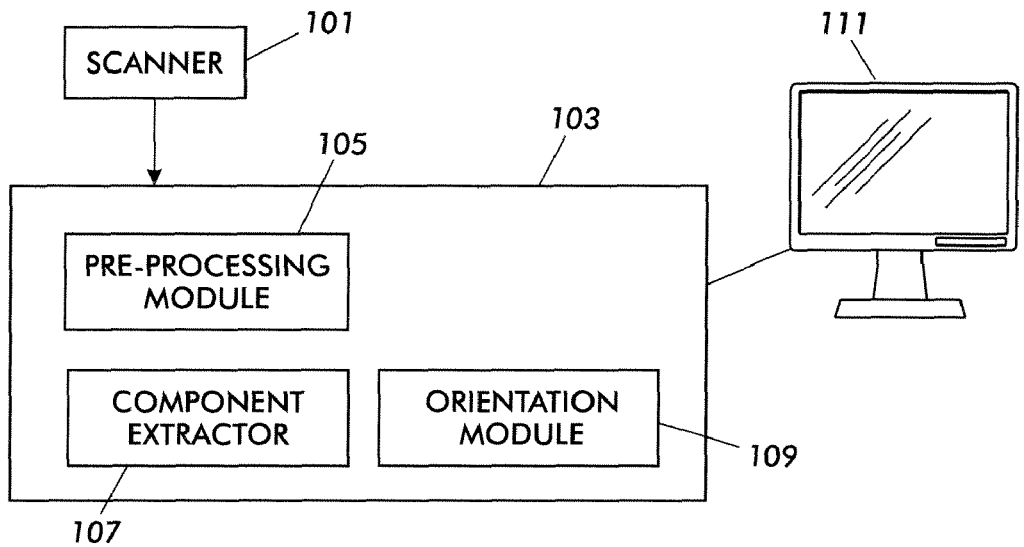
FIG. 1 is an illustration of the system incorporated into an embodiment of a scanner system in accordance with the present disclosure

Now referring to FIG. 1 where the system according to one embodiment is provided. The system includes a scanner 101 is in communication with a CPU 103. The CPU 103 includes a preprocessing module 105, a component extractor 107 and an orientation module 109. The CPU 103 is also in communication with a monitor 111.

FIG. 1 depicts but one embodiment according to the present disclosure. It should be understood that these elements as shown, may be assembled through a variety of configurations. Furthermore, the modules contained within the CPU 103 may be combined or separated and spread throughout a variety of system elements.

The scanner 101 is configured to read in an input image. This input image is transferred to the CPU 103 for further processing and analysis. Generally, the input image is read in having a given orientation. The given orientation may be 90°, 180° or 270° away from its proper orientation or in its proper orientation. In order to deduce its proper orientation, the input image is fed through to a preprocessing module 105 under its given orientation.

The preprocessing module 105 is generally configured to prepare the image for processing. The preparation step includes binairizing the page to black and white.

After binairization, the component extractor 107 is configured to extract the connected components. This process is standard procedure for many applications. A variety of algorithms are known in the art which accomplish this step. The image is then read by the orientation module 109. The orientation module 109 is configured to process the second phase of the method. Through this phase the page is determined to be in portrait or landscape. The portrait or landscape determination may be accomplished through height/width ratios for the extracted connected components. Most characters have a height/width ratio that is greater than 1. Through this analysis portrait/landscape can easily be detected by counting the numbers of connected components whose aspect ratios are greater than 1 or smaller than 1. If the majority of connected components have a height/width ratio that is greater than or equal to 1, the image is either 0° or 180° from proper orientation. The converse is also true, where if the height/width ratio for many connected components is smaller than 1, the image is either 90° or 270° from its proper orientation. Through this method a second orientation is derived where the second orientation is either 0° or 180° from its proper orientation.

The orientation module 109 is also configured to detect whether or not the image is upside down. As stated above, the second orientation places the image either in its proper orientation or 180° from its proper orientation. Selective OCR is run for a sample character in order to determine whether an image is upside down or in its proper orientation. Through this analysis the proper orientation is derived and the image may be displayed through the use of a monitor 111.

Figure 2:
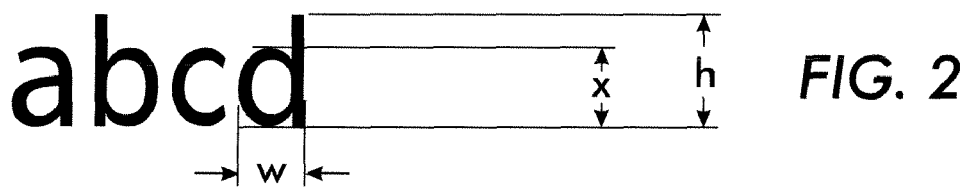
FIG. 2 is an illustration depicting a height and width ration analysis.

Now referring to FIG. 2 which shows a few sample characters in which to conduct height/width ratio. FIG. 2 shows the sample characters a, b, c and d. The w represents the width of the characters, x represents the x-height of the characters and h represents the height of the characters. These four characters, individually, or taken as a whole, have a height/width ratio that is greater than 1 when the image is either in its proper orientation or 180° from its proper orientation. The analysis represented by FIG. 2 may be helpful in determining the portrait/landscape detection step of the method.

The x-height analysis in FIG. 2 may be beneficial when a sample character is chosen. This is at least in part because the character "i" upside down is very similar to the "!" character.

Upside down detection is the third phase in the method. This is based on selective OCR. The lower case "i" is chosen for this purpose. To detect the "i" each connected component is examined to see if its height/width ratio is greater than a threshold. If it is, the connected component could potentially be the stroke of "i". It is further checked to see if there is a dot above or below it. Two counters may be applied to count both cases, the dot above the stroke case and the dot below the stroke case. If more dots above the stroke cases are recorded, the page orientation is generally perceived to be 0°. If the stroke above the dot orientation is recorded more times than the dot above the stroke orientation, the page orientation is likely upside down.

A filter may be applied to prevent counting the "!". The exclamation point is generally composes of a dot and a stroke, but in the opposite direction of "i". One of many methods may be used in order to filter out the exclamation point. One method includes analyzing the height of a potential stroke and comparing it to the x-height as shown in FIG. 2. The x-height is the dominant height for lower case characters. The stroke length of the "i" is close to the x-height, however, the stroke is slightly longer in the "!". Other methods may be invoked in order to filter the "!". All dot above stroke cases and dot below stroke cases are recorded, but the sample with the fewer count may be discarded in the analysis because "i" has a much higher appearance frequency than the "!". This makes filtering typically unnecessary, particularly in documents with a significant number of characters.

Figure 3:
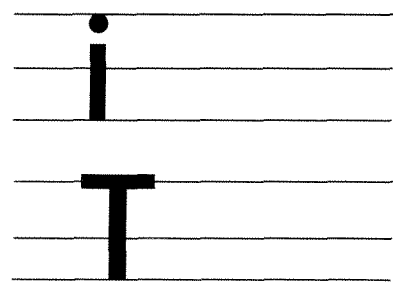
FIG. 3 is an illustration which depicts the sample character recognition analysis through a limited version of character recognition.

The selection of the "i" fails for two types of documents in particular, documents composed entirely of capital letters and Russian documents. These two documents do not contain the "i". In these two cases when the "i" results in 0 or very small count generally the letter "T" is detected, as shown in FIG. 3. T has the following characteristics. The aspect ratio is close to 1. This can be the first criterion for finding the "T". Second criteria is that the top few lines contain one run that expand almost the entire character width. The third criteria is that the scan lines in the middle or the lower part (approximately 50-75% of the height from the top) of the character contains only one run through the horizontal scan line. The run is much shorter than the character's width and should generally be in the middle of the character in the horizontal direction. The one run may also appear in the left half for italic characters.

It should be noted that the very bottom of the vertical stroke in the "T" may not be thin due to its serif. The detection of "T" checks through these three features; 1) discards all connected components that have too high or too low aspect ratio; 2) in the top several scan lines at least one of them should be composed of a long run that extends almost the entire character width; and, 3) middle and lower scan lines are composed of one run that is shorter than the threshold, e.g. one third of the character's width. The x-coordinate of the center of the run is smaller than the other threshold, e.g. 0.6 of the character's width. These features for the second and third components are checked in both the 0° and 180° directions as shown in FIG. 3. Two counters may be used in order to record the results. It should be noted that this procedure may also detect "r" and "⌈" as well. However, since these misclassifications also follow the same page orientation direction, there is no need to distinguish these three characters.

Figure 4:
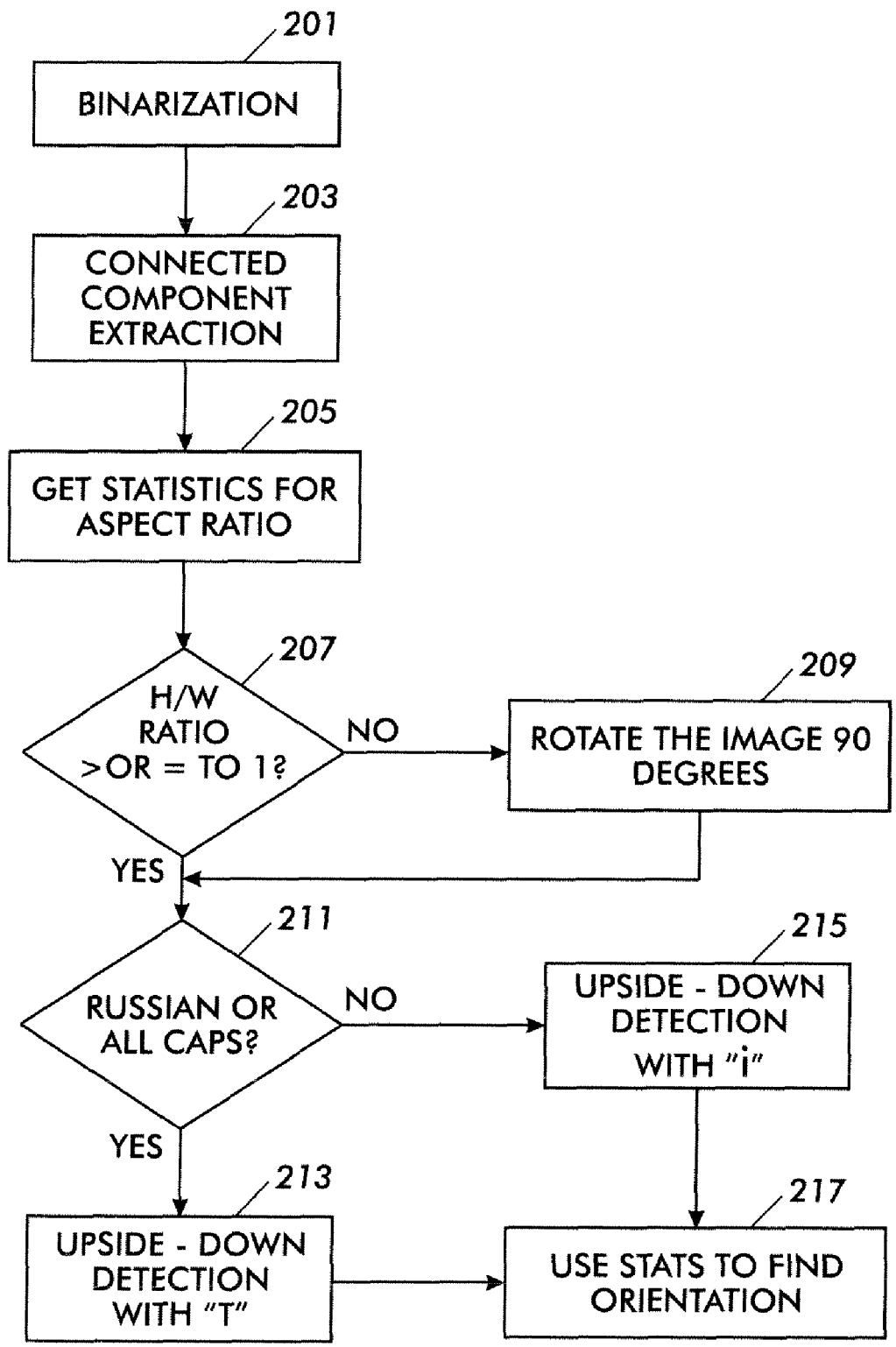
FIG. 4 is a flow chart of one of the methods accord to an embodiment according to the present disclosure.

Now referring to FIG. 4 which is the method according to one embodiment of the disclosure. The method begins with binairization (at step 201). This step includes classifying pixels in the scanned image as either black or white in order to simplify the future analysis.

The method continues with the connected component extraction (at step 203). The component extractor 107, FIG. 1, is adapted in order to perform this function. Through this step, the individual connected components may be extracted for further analysis. Stated another way, each characters may be processed as an individual.

The method continues with getting statistics for aspect ratio (at step 205). As shown in FIG. 2, aspect ratio statistics include a height to width ratio because the majority of characters have a height to width ratio that is greater than or equal to 1. These statistics are useful in determining whether an input image is in landscape or portrait.

The method continues with an analysis of the height to width ratio (at step 207). Generally, if the height to width ratio is equal to or greater than 1, it is understood that the image is either upside down or at its proper orientation. However, if the height to width ratio is less than 1, the method will continue with rotating the image 900 (at step 209). This rotation may be in the clockwise or counterclockwise position. Once the image has been rotated 90°, the image will either be in its proper orientation or upside down. This generally narrows our orientation down to two choices.

The method continues with the determination of which character will be our sample character for upside down detection (at step 211). There may be instances where the system will know that the image will not have the lower case "i" which is generally the first choice for analysis. This situation may include Russian text or text with all capital letters. In one embodiment, the image is run as if it has a lower case "i". If there are very few "i"s detected, the method continues with assuming that the text is either Russian or all capital letters. However, in some embodiments, the user may input that it is a Russian document or a document with all caps or for some other reason they document without the lower case "i". The method can continue with a different sample character.

Once it is determined that the "i" will be the sample character, the method continues (at step 215) with upside down detection using "i". This step is further detailed with FIG. 5. If it is determined that "i" does not exist in the document, the method continues (at step 213) with upside down detection using "T".

The method continues with using steps to find orientation (at step 217). Regardless of the sample character used, the statistics may be implemented to narrow the orientation to a proper orientation. These steps may include the number of right side up and/or upside down detections of the sample character. Generally, when a document has more upside down detections, the document is in an upside down orientation. The converse is also true where there are more right side up detections of the sample character than the document is in its proper orientation. Through these steps the document may proceed with displaying and/or other analysis and processing while the document is in its proper orientation.

Figure 5:
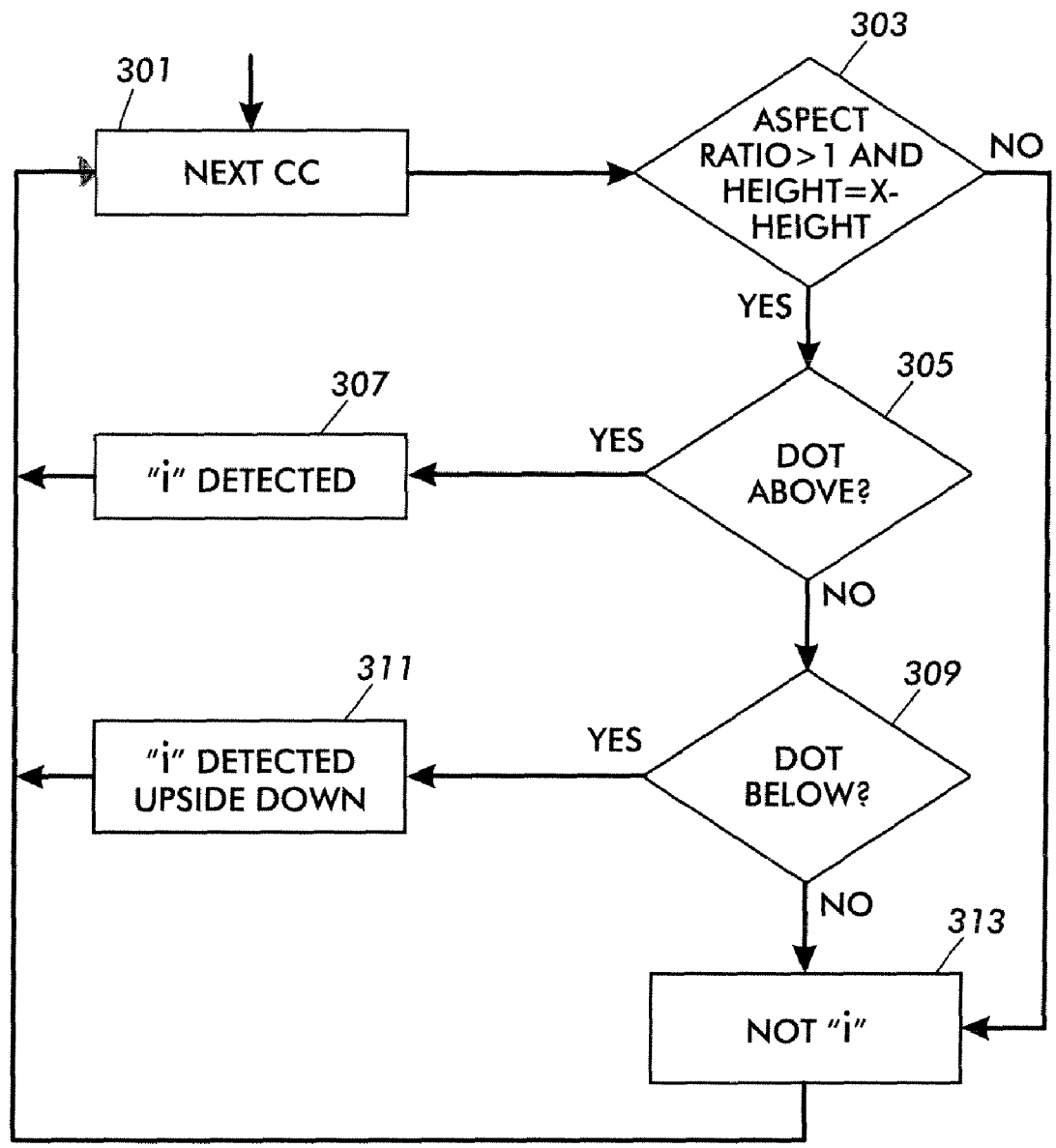
FIG. 5 is a flow chart of a limited character recognition of the character "i".

Now referring to FIG. 5 which is a flow chart detailing the upside down detection using the character "i" is shown. The method begins (at step 301) with finding the next connected component (at step 301). A limited OCR program may be used in order to find the sample character. In this case the sample character is the "i". However, because the selective OCR is only searching for one letter in one or two orientations, a full scale OCR is not necessary. Therefore, this program may be available in small systems which have limited resources. In this embodiment, the sample character "i" is used because of its distinguishing characteristic. The "i" and "j" are the only two characters that exist with a dot. However, "i" is distinguishable from "j" in that the stroke in "i" does not go beyond x-height. Furthermore, "i" is a very common letter and exists naturally in most documents with text. It should also be noted that "i" and "j" will yield the same orientation results. So, it is generally not necessary to distinguish between the two.

The method continues (at step 303) with determining if the aspect ratio is greater than 1 and the height equal to the x-height. The "i" has these two distinguishing characteristics. Therefore, if the character that is encountered has these two aspects, further investigation is not needed to determine if it is an "i".

The method continues with seeing if there is a dot above the stroke (at step 305). If the answer is yes (at step 307) we note that an "i" is detected. In some embodiments when a count is necessary, the "i" count is increased to reflect that the "i" is detected.

If there is no dot above the stroke the method continues (with step 309) with a determination of if there is a dot below the stroke. If so, the method continues (at step 311) with the detection of an upside down "i". As with the "i" detection, a count may be needed for the upside down "i" in order to track the statistics in order to find a proper orientation 217, FIG. 4.

If there was no dot above or below the stroke, or the aspect ratio was not greater than 1 and the height was not x-height, then the character, which was detected was not "i" (at step 313). The method continues with finding the next connected component (at step 301). This process may be repeated through the entire text of the document or until enough statistics have been collected in order to form a conclusion.

Figure 6:
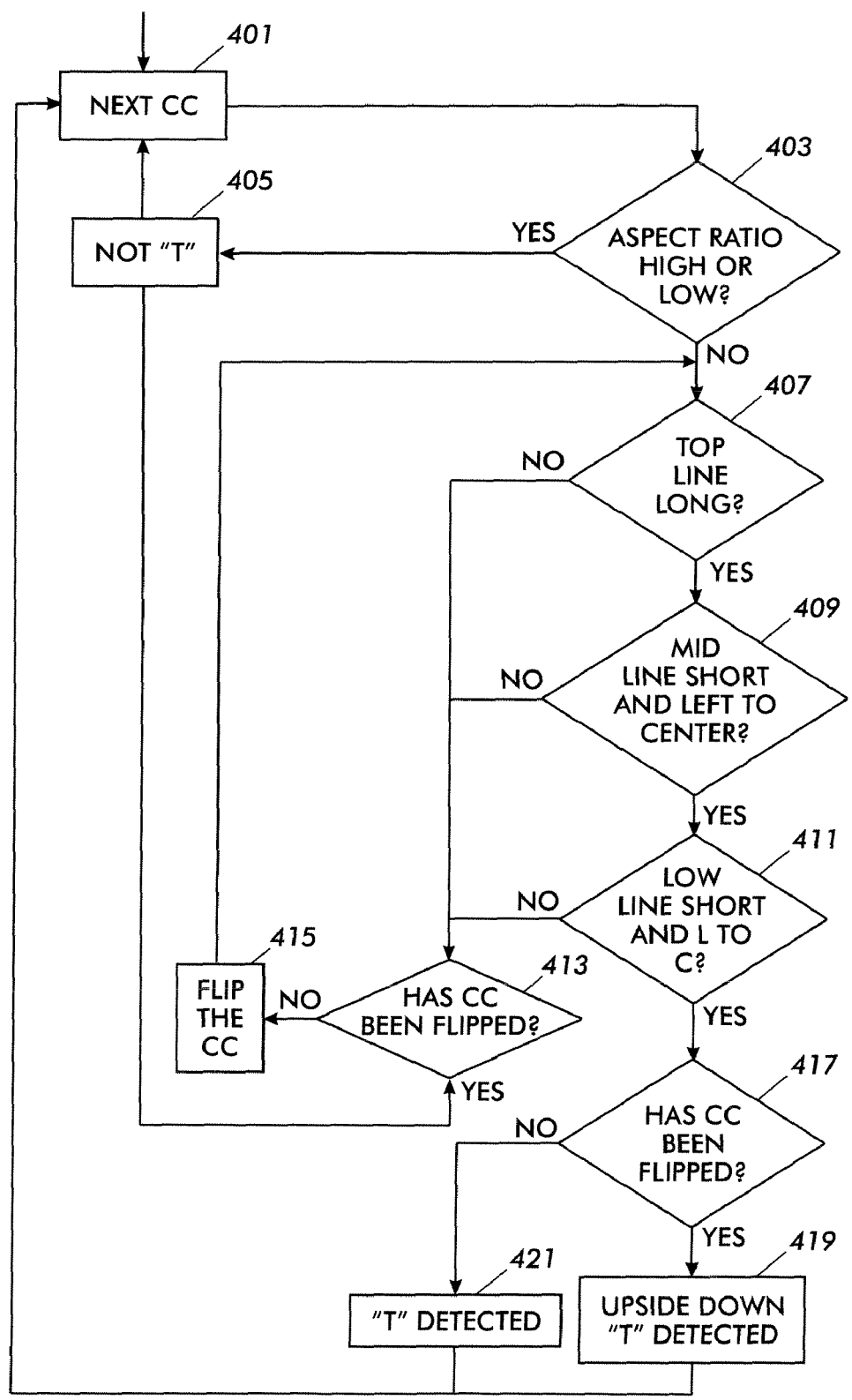
FIG. 6 is a flow chart of the character analysis based on a limited version of the character recognition for the character "T".

Now referring to FIG. 6, a flow chart detailing the analysis for the sample character being a "T" is shown. The method begins with finding the connected component (at step 401). The method continues on with a determination of the aspect ratio (at step 403). If the aspect ratio is high or low, a conclusion can be drawn that the character is not "T" (at step 405). This is generally the case because the aspect ratio for the "T" should be relatively close to 1, as the "T" is generally as tall as it is wide.

If the aspect ratio is not high or low, the method continues with an analysis of the top line (at step 407). If the top line is long we continue with an analysis with the midline (at step 409). From a horizontal perspective, the midline should be short and to the left or center of the character as a whole. Generally, the midline will be at the center if the character is indeed a "T". However, in some cases, the line may be slightly to the left due to italicization and/or other fonts. Furthermore, the character "[" or "r" may be detected. Because these characters have the same orientation as the "T" there is no harm in detecting these characters.

Continuing on, a low line analysis is implemented (at step 411). If the low line is short and left or center, then we can conclude that a "T" has been detected. However, if either step 407, 409 or 411 has a negative answer, the method continues with a determination if the character has been flipped (at step 413). In the first run of this method, the character has not been flipped, and through this analysis we would flip the character (at step 415) and go through step 407, 409 and 411 again. However, if this method has already tested 407, 409 and 411 and if any of these cases comes up negative, then an analysis of 413 will read in the affirmative, e.g., the character has been flipped. If it has been determined (at step 413) that the character has been flipped, the method continues (at step 405) with the determination that the character is not "T" and the method continues on with the next character (at step 401). If the aspect ratio requirement is met, then the character will be flipped before a determination is made that the character is not "T" in this embodiment.

The method continues (with step 417) with the determination of whether the character has been flipped if the character has met the criteria for "T" by a positive answer from step 403, 407, 409 and 411. If the character has been flipped the method continues (with step 419) with a detection of an upside down "T". However, in the alternative, if this was the first run through steps 407, 409 and 411, then the character has not been flipped (at step 415) and a "T" has been detected (at step 421). It should be noted that at step 421 and/or at step 419 a count may be implemented with each detection. The count may be used as a statistic in order to determine the orientation (at step 217, FIG. 4).

The above description merely provides a disclosure of the particular embodiments and is not intended for purposes of limiting the same thereto. As such, this disclosure is not limited to only the above-described embodiments. Rather, it is recognized that one skilled in the art could conceive alternative embodiments that fall within the scope of the invention.

It will be appreciated that variations of the above-disclosed and other features and functions, or alternatives thereof, may be desirably combined into many other different systems and/or applications. Also that various presently unforeseen or unanticipated alternatives, modifications, variations or improvements therein may be subsequently made by those skilled in the art which are also intended to be encompassed by the following claims.

The invention claimed is:

1. A method of detecting simple page orientation based on a limited version of character recognition comprising:
    binarizing a page including a plurality of alphanumeric characters having a first orientation;
    extracting connected components;
    determining a second orientation where said second orientation is based on a 90° turn, clockwise or counter clockwise, or no turn from said first orientation, where said second orientation results in a 180° variance from a proper orientation or a proper orientation;
    implementing a limited version of optical character recognition for an analysis of a character "i", wherein said analysis comprises counting a number of appearances of said character "i";
    differentiating said count by orientation when the number of connected components is above a predetermined threshold and concluding that the orientation with the highest count is the "i" character and the orientation with the lowest count is the "!" character; and
    determining if said second orientation is upside down based, at least in part, on said analysis.

2. The method according to claim 1 wherein said second orientation is implemented through an analysis of height/width ratios.

3. The method according to claim 1, further comprising filtering the character "!".

4. The method according to claim 3, further comprising if the number of connected components is below a predetermined threshold conducting an x-height comparison for differentiating between the "i" and "!" characters.

5. The method according to claim 1, further comprising if the count for "i" is below a second predetermined threshold, analyzing said character as a "T".

6. The method according to claim 1, further comprising displaying said page.

7. A method of determining a proper orientation of a scanned image having a plurality of alphanumeric characters comprising:
    receiving a scanned image having a given orientation;
    binarizing said scanned image to black and white;
    determining height to width ratios for said plurality of alphanumeric characters;
    finding a second orientation by determining if said given orientation is 90° or 270° away from the proper orientation based at least in part on said height to width ratio, where said second orientation is either said proper orientation or 180° from said proper orientation;
    identifying a sample character as character "i" for 180° orientation analysis based on selective optical character recognition; and
    determining if said second orientation is 180° or 0° from said proper orientation through analysis of said sample character, wherein said analysis comprises counting a number of appearances of said sample character, and wherein if said count for the character "i" is below a predetermined threshold, identifying said sample character as character "T" for 180° orientation analysis based on selective optical character recognition.

8. The method according to claim 7, further comprising implementing a filtering algorithm for the character "!".

9. The method of claim 8, wherein filtering for the character "!" further comprises:
    extracting connected components; and
    differentiating said count by orientation when the number of connected components is above a second predetermined threshold and concluding that the orientation with the highest count is the "i" character and the orientation with the lowest count is the "!" character.

10. The method according to claim 7, further comprising receiving input data conveying that said scanned image does not contain the character "i".

11. The method according to claim 7, further comprising displaying said image with said proper orientation.

12. A scanning device configured to determine the orientation of a scanned image having a plurality characters comprising:
    a scanner configured to read an input image with a given orientation;
    a pre-processing module in communication with said scanner adapted to binarize said input image;
    a component extractor configured to isolate characters for an orientation analysis; and
    an orientation module configured to appraise height to width ratios for a plurality of alphanumeric characters within said input image in order to find a second orientation by determining if said given orientation is 90° or 270° away from a proper orientation, where said second orientation is either said proper orientation or 180° from said proper orientation, identify a sample character as character "i" for 180° orientation analysis based on selective optical character recognition, count a number of appearances of said sample character and determine if said second orientation is 180° from said proper orientation or said proper orientation, and if said count for the character "i" is below a predetermined threshold, identifying said sample character as character "T" for 180° orientation analysis based on selective optical character recognition.

13. The device according to claim 12, further comprising a monitor configured to display said input image with said proper orientation.

14. The device according to claim 12, further comprising a user interface configured to allow input from a user which signifies that said input image does not contain the "i" character.

15. The device according to claim 12, wherein the orientation module is further configured to differentiate said count by orientation when the number of connected components is above a second predetermined threshold and concluding that the orientation with the highest count is the "i" character and the orientation with the lowest count is the "!" character.

* * * * *